United States Patent
Chochole et al.

(10) Patent No.: US 10,204,751 B2
(45) Date of Patent: Feb. 12, 2019

(54) METHOD AND ARRANGEMENT FOR PARAMETERIZING BAY CONTROLLERS AND/OR PROTECTIVE DEVICES OF A SWITCHING ARRANGEMENT

(71) Applicant: SIEMENS AKTIENGESELLSCHAFT, Munich (DE)

(72) Inventors: Michael Chochole, Vienna (AT); Dieter Kramer, Dresden (DE); Jan Moeller, Berlin (DE); Markus Wache, Allersberg (DE)

(73) Assignee: Siemens Aktiengesellschaft, Munich (DE)

( * ) Notice: Subject to any disclaimer, the term of this patent is extended or adjusted under 35 U.S.C. 154(b) by 257 days.

(21) Appl. No.: 15/137,137

(22) Filed: Apr. 25, 2016

(65) Prior Publication Data
US 2016/0314913 A1 Oct. 27, 2016

(30) Foreign Application Priority Data
Apr. 23, 2015 (EP) .................................. 15164857

(51) Int. Cl.
*H01H 9/26* (2006.01)
*H02H 7/22* (2006.01)
(Continued)

(52) U.S. Cl.
CPC .............. *H01H 9/26* (2013.01); *H02H 7/22* (2013.01); *H02H 11/008* (2013.01); *H02J 13/0013* (2013.01)

(58) Field of Classification Search
CPC .............................. H02H 7/22; H02H 11/008
See application file for complete search history.

(56) References Cited

U.S. PATENT DOCUMENTS

| 4,507,703 A | * | 3/1985 | Blau | ................... H02H 11/008 307/115 |
| 4,767,941 A | * | 8/1988 | Brand | ................. H02H 11/008 307/43 |

(Continued)

FOREIGN PATENT DOCUMENTS

| CN | 1097872 C | 1/2003 |
| CN | 101416189 A | 4/2009 |

(Continued)

OTHER PUBLICATIONS

"Substation Configuration Language", Apr. 6, 2015, Wikipedia, retrieved via Internet Archive Wayback Machine at <https://web.archive.org/web/20150406013114/https://en.wikipedia.org/wiki/Substation_Configuration_Language>.*

(Continued)

*Primary Examiner* — Rexford Barnie
*Assistant Examiner* — David Shiao
(74) *Attorney, Agent, or Firm* — Laurence Greenberg; Werner Stemer; Ralph Locher

(57) ABSTRACT

A method automatically parameterizes bay controllers and/or protective devices of a switching arrangement. The method includes automatically detecting the topology of the switching arrangement on the basis of topology information, and automatically determining interlocking and/or enabling conditions for at least one device on the basis of the topology. Communication connections for the at least one device are automatically specified while taking into account the interlocking and/or enabling conditions determined for this device. The at least one device is parameterized with the interlocking and/or enabling conditions and the communication connections and the topology determined for this device, so that interlocking or enabling of a switching action (Continued)

in the at least one device is controllable during the operation of the switching arrangement.

11 Claims, 6 Drawing Sheets

(51) Int. Cl.
*H02H 11/00* (2006.01)
*H02J 13/00* (2006.01)

(56) References Cited

U.S. PATENT DOCUMENTS

| | | | |
|---|---|---|---|
| 6,137,776 | A | 10/2000 | Bauerschmidt et al. |
| 8,265,908 | B2 | 9/2012 | Kirrmann et al. |
| 2002/0059477 | A1* | 5/2002 | Wimmer .................. H02J 3/00 710/1 |
| 2010/0161151 | A1* | 6/2010 | Yang ....................... H02J 13/00 700/297 |
| 2010/0204948 | A1 | 8/2010 | Kirrmann et al. |
| 2010/0256832 | A1* | 10/2010 | Kirrmann .............. H02H 7/261 700/293 |
| 2011/0282507 | A1 | 11/2011 | Oudalov et al. |
| 2013/0024037 | A1* | 1/2013 | Jin ........................ G05B 17/02 700/292 |
| 2013/0346057 | A1* | 12/2013 | Lin ........................... H02J 3/00 703/18 |
| 2014/0114638 | A1* | 4/2014 | Jin ......................... G05B 17/02 703/18 |
| 2016/0179118 | A1* | 6/2016 | Song ...................... H02J 3/006 700/295 |

FOREIGN PATENT DOCUMENTS

| | | |
|---|---|---|
| CN | 101842713 A | 9/2010 |
| CN | 102239645 A | 11/2011 |
| DE | 3812072 A1 | 10/1989 |

OTHER PUBLICATIONS

Siemens AG: "DIGSI 5 Software Description V4.00", Release status: Oct. 2013 , Document version: C53000-D5040-C001-5.

Berthold, Steffen, Dissertation "Der integrierte Schaltfehlerschutz sowie neue Verfahren zur Projektierung und Abarbeitung von Schaltverriegelung"; Techn. University Dresden, DE, 1992.

Hoppe-Oehl, Heinrich : Dissertation "Ein universelles Verriegelungsverfahren auf topologischer Basis", Techn. Universtiy of Saarland, DE; 1991.

Kopainsky, J., et al. : "Topology-Based Interlocking of Electrical Substations", IEEE Transactions on Power Delivery, IEEE, Jul. 1986, pp. 118-126.

* cited by examiner

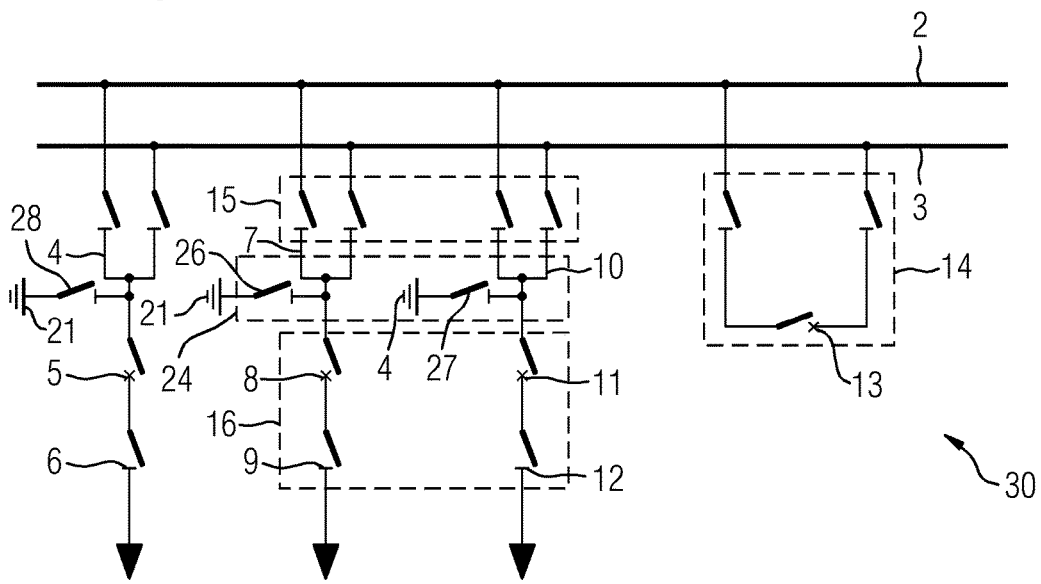
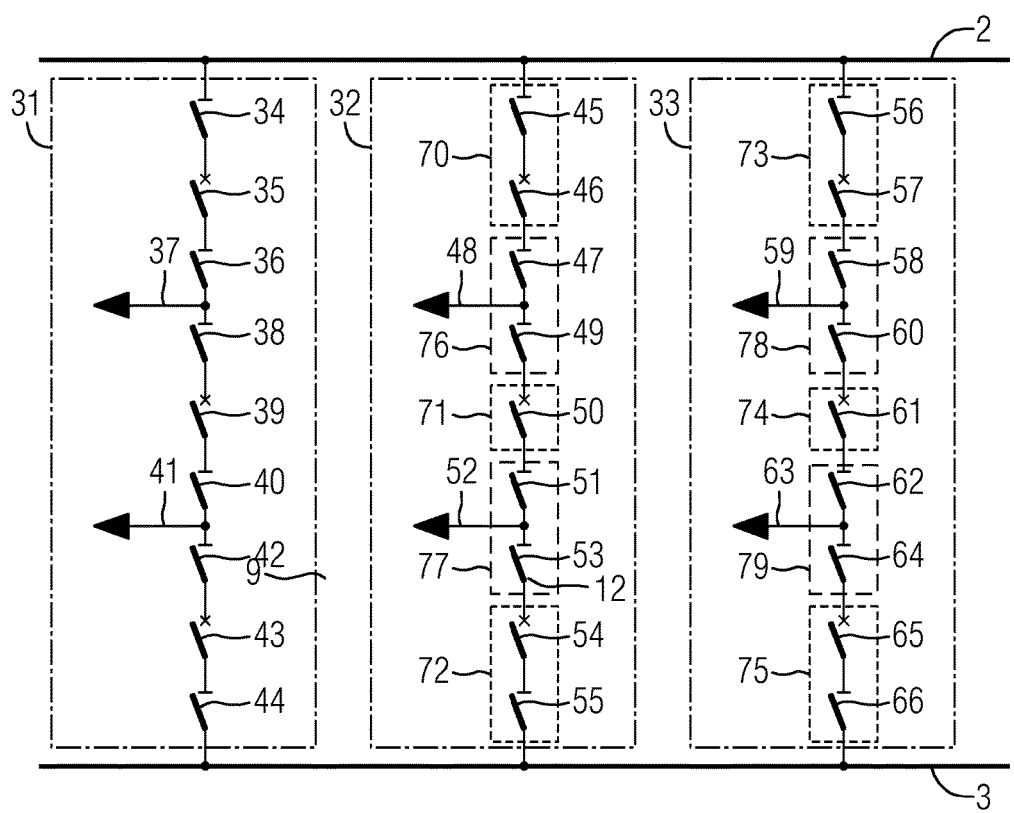

METHOD AND ARRANGEMENT FOR PARAMETERIZING BAY CONTROLLERS AND/OR PROTECTIVE DEVICES OF A SWITCHING ARRANGEMENT

CROSS-REFERENCE TO RELATED APPLICATION

This application claims the priority, under 35 U.S.C. § 119, of European application EP15164857.3, filed Apr. 23, 2015; the prior application is herewith incorporated by reference in its entirety.

BACKGROUND OF THE INVENTION

Field of the Invention

The invention relates to a method for parameterizing interlocking conditions for bay controllers and/or protective devices of a switching arrangement.

Interlocks to prevent maloperation play an important part in electrical switchgear. This protection ensures that switching devices are only switched when it is also admissible. In particular, it is intended to avoid switching of disconnectors under load, coupling of asynchronous power supply units, switching to equipment that is grounded or grounding of equipment that is under voltage. This means for example that a closed switch in one part of an electrical power supply system prevents tripping of a disconnector in another part of the electrical power supply system, which is known as "interlocking". The dependence of the decision to enable switching or to interlock one specific switching device on the switching state of other switching devices is a result of the topology of the energy supply system. Within the scope of this patent application, the term interlocking conditions also includes enabling conditions.

It is intended for the switchgear interlocking to prevent defective or unwanted switching actions from causing harm to persons or damage to technical equipment. A distinction is made between safety-related decisions, which avoid a risk to people and equipment, and operation-related decisions, which essentially reflect the operating philosophy of an installation and restrict the safety-relevant enabling of switching actions. There may for example be an operating philosophy that, for reasons of overall clarity, maintains the switching sequence in such a way that a power circuit breaker is only closed when the corresponding disconnectors are closed. Further examples of aspects to be noted within an operating philosophy are tripping or transferring an outgoing unit to an additional auxiliary bus bar, coupling bus bars, ensuring a continuous power supply and maintaining the limits of withstanding a short circuit of the circuit breakers that are used.

It has been customary so far in the prior art to make the decisions for enabling switching or interlocking with the aid of Boolean equations. These equations must be individually configured for each installation, which in the case of relatively large installations is very complex and confusing. This increases the risk of erroneous or incomplete expressions and equations and associated safety risks.

For this reason, ideas for an automatic evaluation of the interconnection of switching devices, that is to say the topology of an electrical switchgear, have been developed in the prior art. With the aid of the topology, it is possible to automate at least partially the creation of interlocking conditions for the switching devices and thus reduce the configuration effort in the parameterization of the switching devices. It has generally been the practice here to consider an individual switching arrangement with multiple bays.

The interlocking of switching actions on the basis of topological information is treated in the dissertation entitlte "Ein universelles Verriegelungsverfahren auf topologischer Basis" [A Universal Interlocking Method on a Topological Basis] by Heinrich Hoppe-Oehl, submitted to Saarland University in 1991. It involves for example an evaluation of prescribed interlocking conditions being performed by means of a centralized interlocking device. A topology is detected on the basis of image recognition from a single-line overview (pages 36 and 37), interlocking patterns being detected on the basis of a pattern recognition by means of prescribed patterns and taken into account (pages 77-79 and 88).

Furthermore, the dissertation by Steffen Berthold at the University of Dresden (1992) "Der integrierte Schaltfehlerschutz sowie neue Verfahren zur Projektierung and Abarbeitung von Schaltverriegelung" [Integrated Switchgear Interlocking and New Methods for the Planning and Execution of Interlocking] is concerned with the interlocking of switching actions on the basis of topological information. In order to achieve operationally dependent interlocking conditions for switchgear, additional efforts have to be undertaken. It is mentioned that this concerns a pattern recognition that has to be evaluated for the interlocking. These patterns must however be defined in advance.

Furthermore, German patent application DE 38 12 072 C3 discloses the possibility of evaluating the topology of the interconnection of switching devices of a switch gear. Operationally dependent interlocking can be achieved by the safety-related interlocking conditions being extended with Boolean equations. It is assumed here that the operationally dependent and safety-related interlocking conditions are centrally determined and transferred into the individual switching devices during the planning of an installation.

Also known is the IEEE publication "Topology-Based Interlocking of Electrical Substations" by J. Kopainsky, W. Wimmer and K. P. Brand, appearing in "IEEE Transactions on Power Delivery", July 1986, pages 118-126. In it, a method based on the topology of a switching arrangement is discussed. Both safety-related and operation-related interlocking conditions are based on pattern recognition for components of a topology, which is to say for example for a branch of a circuit.

It is also known from the product description "DIGSI 5, Software-Beschreibung" [DIGSI 5, Software Description], identification number C53000-D5000-0001-5, issue 10.2013, from Siemens AG, to use software to perform simplified planning and operation of all SIPROTEC 5 protective devices. Topologies of switchgear can be input, protective devices configured and corresponding communication networks between the devices planned essentially manually. This takes place offline, it then being possible for the parameterizations created to be transferred to the respective protective devices via a communication network. The topologies of switchgear are set up as a single-line representation and hardware and networks are added on a graphical basis (symbolically). With the function "Continuous Function Chart" (page 294 ff.), interlocking conditions can also be parameterized manually by the user, with Boolean equations being used.

SUMMARY OF THE INVENTION

The invention addresses the problem of providing on the basis of the known method according to the DIGSI 5 software, a method with which an automatic parameterization of interlocking and/or enabling conditions for bay controllers and/or protective devices of a switching arrangement can be performed, and adapted if need be, particularly easily, safely and quickly.

The invention solves this problem by a method for the automatic parameterization of bay controllers and/or protective devices of a switching arrangement. The method includes the steps of:

automatically detecting the topology of the switching arrangement on the basis of topology information;

automatically determining interlocking and/or enabling conditions for at least one device on the basis of the topology;

automatically specifying communication connections for the at least one device while taking into account the interlocking and/or enabling conditions determined for this device; and parameterizing the at least one device with the interlocking and/or enabling conditions and the communication connections and the topology determined for this device, so that interlocking or enabling of a switching action in the at least one device is controllable during the operation of the switching arrangement.

Within this application, bay controllers and/or protective devices are referred to together as devices.

A parameterization in the sense of the invention is the setting of a device with all of the information, operating parameters, etc. that are necessary for operation.

The detecting of interlocking and/or enabling conditions means for example that a first device is parameterized to the extent that, when there is knowledge of the switching positions of other devices of the switching arrangement, a switching command is enabled or is blocked. An interlocking condition may for example be specified for a device in such a way that, when there is knowledge of other switching positions within the switching arrangement (transmitted from other devices), a switching command is blocked, because it would switch a voltage to ground. A suitable possibility for specifying interlocking conditions is provided by Boolean equations (of the kind: "if switch x is closed, then block opening of switch y").

A communication connection in the sense of the invention should not be understood as meaning exclusively a physical line or optical connection or radio link, but rather the information required for a device to communicate with one or more other devices. When specifying a communication connection for a device, it is therefore for example an item of information that specifies in what way something is to be conveyed by the device concerned to another device. This information may for example comprise a switching position of a power circuit breaker assigned to the device; with this switching position having to be conveyed to one or more other devices as a message with specific device identification (IP address, header, or the like).

A detection of the topology may take place for example by the "modified search" (FIGS. 6 to 8) of a topology that is described in this application.

A topology in the sense of the invention is the interconnection of components of the switching arrangement, such as for example bus bars, disconnectors and power circuit breakers. The topology information is information that reproduces this interconnection.

It is an advantage of automatic parameterization that the interlocking and/or enabling conditions are automatically derived from the topology, because the planning effort for a new bay with bay controllers and/or protective devices is therefore low. It is also advantageous that, when the bay is changed, such as for example when new bay controllers and/or protective devices are used, or when there is a changed supply system, an updating of the interlocking and/or enabling conditions can be performed particularly quickly and easily.

This constitutes considerably less effort when commissioning an installation with for example 40 switchgear bays than for a comparable installation in which, after conventional manual parameterization of each bay controller and/or protective device, around 2500 logic modules (for example in the SIPROTEC CFC software from Siemens AG) have to be connected and corresponding communication connections input manually. Therefore, the commissioning can be carried out with far less effort and with a much lower probability of errors.

All that is necessary when commissioning is for example to use the so-called single-line editor to draw a representation of the switchgear and correspondingly allocate the switching devices to the protective devices and bay controllers. Subsequently, after parameterization of the bay controllers and/or protective devices has taken place, easy and reliable interlocking and enabling of switching actions between the bay controllers and/or switching devices can be controlled. This is a major advantage over the methods of the prior art described at the beginning, in which a centralized control of the interlocking and enabling of switching actions takes place. The interlocking or enabling decisions therefore no longer have to be taken centrally by a device in the switchgear but can be distributed among the devices in a decentralized and cross-bay manner. This has the effect that, even in the event of failure of one device, the bays that are not affected by the failure can continue to be interlocked or enabled in a cross-bay manner.

The method according to the invention also offers further advantages when extending or changing the installation or when changing the operating philosophy. In this case, only the single-line diagram or the parameters for describing the operating philosophy have to be correspondingly adapted. The necessary adaptation of the parameterization of the bay controllers and/or protective devices is subsequently performed automatically by the method according to the invention.

By contrast with this, in the case of a conventionally planned installation with linked logic modules (SIPROTEC CFC plans) it may happen that all or almost all of the links have to be adapted, which involves a very great effort in terms of engineering and testing.

In addition, there is the possibility of using a switchover to suspend the operationally dependent interlocking or enabling of actions. This suspension of the operationally dependent interlocking or enabling may be applied to all the bays or only to selected bays. It allows a high level of safety, combined with operational flexibility. The safety-related interlocking may be completely retained and, in this way, inadmissible switching actions prevented. If it is nevertheless necessary for carrying out maintenance work on a bay also to suspend the safety-related conditions, this may also take place in a manner limited to one bay.

In a preferred embodiment of the method according to the invention, interlocking or enabling of a switching action in the at least one device is controllable in a decentralized manner during the operation of the switching arrangement. In this case, by providing the determined interlocking and/or enabling conditions and the communication connections and the topology, the device is made able to take decisions on enabling or interlocking independently. It must consequently have its own computer to evaluate the topology. This is an advantage, because no centralized control device for the devices is required, which saves costs. Furthermore, availability is improved, because the decentralized control allows continued operation of the switching arrangement to be ensured even when one device fails. This would not be the case with centralized control.

In a preferred embodiment of the method according to the invention, interlocking or enabling of a switching action in the at least one device is controllable in a centralized manner during the operation of the switching arrangement. In this case, decisions on enabling or interlocking are taken centrally in a control device, which correspondingly has computer means. This is an advantage; the centrally controlled devices do not require computer means of their own—or require computer means designed for lower computer power than would be needed in the case of decentralized control—which saves costs.

In a preferred embodiment of the method according to the invention, interlocking or enabling of a switching action in the at least one device is controllable in a centralized manner during the operation of the switching arrangement.

In a further preferred embodiment of the method according to the invention, a switching arrangement is part of an electrical supply system and a single-line diagram of the interconnection of bus bars, bays, power system groups, power circuit breakers, disconnectors, bay controllers and/or protective devices is used as topology information.

The electrical supply system may in this case be a high-voltage, medium-voltage or low-voltage system or a traction power supply system.

This embodiment is advantageous because a particularly easy input and representation of the topology of the supply system is possible in this way by means of the single-line diagram. An input of the single-line diagram may take place for example by means of the so-called single-line editor in the DIGSI software from Siemens AG. A single-line diagram is a graphical representation of a switching arrangement.

The graphical representation may in this case be a drawing which is on paper and is scanned in or a computer graphic which is created on a computer.

A computer graphic, which can be displayed on a screen and stored in a file, is generally used. This may be an image file or a file that stores the links between components of the supply system directly in a suitable format.

A graphical representation should be understood in this application as meaning the image itself or a file that makes reproduction of the image possible and makes it possible for it to be stored.

In a further preferred embodiment of the method according to the invention, the supply system in the sense of the invention is an electrical power transmission system or a fluid-conducting transmission system, such as for example a water supply system or a gas supply system, which can be respectively controlled by corresponding bay controllers and switching valves.

In a further preferred embodiment of the method according to the invention, safety-related interlocking and/or enabling conditions and operation-related interlocking and/or enabling conditions are taken into account for the detection of interlocking and/or enabling conditions. This is an advantage, because taking into account operationally dependent interlocking and/or enabling conditions above and beyond the safety-related aspects allows an operating philosophy to be taken into account in an easy way.

In a further preferred embodiment of the method according to the invention, operationally dependent interlocking and/or enabling conditions are parameterized automatically on the basis of a prescribed operating philosophy. This is an advantage, because, after parameters for a specific operating philosophy are input or provided in some other way, the resultant operationally dependent interlocking and/or enabling conditions can also be automatically parameterized.

In a further preferred embodiment of the method according to the invention, the topology information is detected by a search method, in which bus bars and/or bus bar portions that are connected in an electrically conducting manner to a found bus bar and/or a bus bar portion are regarded as a contiguous node. This is an advantage, because it is thus ensured that in a breadth-first search and in a depth-first search the entire topology is in each case detected.

In a preferred development of the search method, a breadth-first search is used. The breadth-first search is performed with preference before the depth-first search. Starting from a switch for which a decision on enabling or interlocking is to be taken, a search is first carried out in one direction or the other along the topology. If a bus bar portion is found, bus bar portions adjacent to it are searched and regarded together as a node. Subsequently, the breadth-first search is continued until the entire topology has been detected. As a result, the breadth-first search finds the shortest parallel path or the potential double (nodes of highest potential from both sides of the switch).

In a preferred development of the searching method, a depth-first search is used. The depth-first search is performed with preference after the breadth-first search. Starting from a switch for which a decision on enabling or interlocking is to be taken, the bus bars that are closest from both sides of the switch are first searched, with again, as described at the beginning, associated portions of the bus bars being regarded as a node. Then, the depth-first search is continued in the known way, with further discovered bus bars again being used for the definition of shared nodes. This is continued until the entire topology has been detected. As a result, the depth-first search finds which parallel paths exist and how long they are. In this case, the length of the paths is relevant in particular for operationally dependent interlocks.

The combination of the breadth-first search and the depth-first search ensures in an advantageous way that the topology can be detected completely and correctly even in the case of complex switching arrangements.

This means that in the breadth-first search searching is carried out as usual in the prior art—with the addition that, when a bus bar is found, the search looks for further bus bar portions that are connected in an electrically conducting manner, in order to regard them as a node. A depth-first search is used if the breadth-first search finds parallel paths, but the shortest path found does not provide sufficient criteria. In the depth-first search, the search looks at the bus bar on both sides, investigates it for further contiguous portions and then continues with the depth-first search. If again the depth-first search encounters bus bar portions, they are also again investigated for connected portions and regarded as a node before the search is continued.

In a further preferred embodiment of the method according to the invention, only communication connections that are required for a transmission of information relevant to the respective device concerning switch positions of the other devices, respectively, are parameterized, so that the data communication between the devices is minimized.

This is advantageous because the data communication concerning switching positions and resultant enabling or interlocking actions is restricted to the relevant cases, which conserves resources, such as for instance the required bandwidth of a data communication, and thus saves costs. Switching positions that are not decisive are not checked. Thus, for example, a communication load on a station bus can be reduced. A further advantage is that the use of a reduced topology makes it possible to manage with comparatively lower computer power and smaller memory space in an individual bay controller or protective device, which saves costs.

In a further preferred embodiment of the method according to the invention, the established interlocking and/or enabling conditions are stored in a general configuration file, which contains parameters of the bay controllers and/or protective devices, and in each case details specifying the interlocking and/or enabling conditions that are relevant for an individual device on the basis of the detected topology and the communication connections that are parameterized for the respective device are stored in each case in a device-specific configuration file, which is transmitted to the respective device.

This is of advantage, because the central recording of all important data in a general configuration file provides a simple overview and easy possibility for updating data, while the specific configuration files make automatic parameterization of the individual bay controllers and/or protective devices possible.

In a further preferred embodiment of the method according to the invention, in accordance with the IEC standard 61850-8-1 a so-called "system configuration description (SCD)" file is used as a general configuration file and so-called "configured intelligent device description (CID)" files are used as specific configuration files, the "configured intelligent device description (CID)" files corresponding to the "Generic Object Oriented Substation Events (GOOSE)" standard. This is an advantage, because the IEC standard 61850-8-1 is widely used and for example also allows communication via an Internet connection or Ethernet.

In a further preferred embodiment of the method according to the invention, voltage and current meters of the switching arrangement are additionally detected automatically. In this case, for example, the position and association of the voltage and current meters in relation to outgoing load units is detected and additional functions can be made available. This is an advantage, because consequently the entire switching arrangement can be automatically parameterized for operation.

Furthermore, the invention addresses the problem of providing on the basis of the DIGSI 5 software an arrangement with which an automatic parameterization of interlocking and/or enabling conditions for bay controllers and/or protective devices of a switching arrangement can be performed, and adapted if need be, particularly easily, safely and quickly.

In order to explain in more detail the way in which the invention works, a first preferred exemplary embodiment of the invention is specified below.

In it, the now described steps are to be carried out.

Using the single-line editor of the DIGSI 5 software to draw the switchgear.

Inputting the switchgear configuration (for example normal, 1½ power circuit breakers, ring bus) in DIGSI 5.

Inputting the bus bars (numbers and portions) in DIGSI 5.

Inputting bay controllers and/or protective devices, switching devices, disconnectors and power circuit breakers, and also assigning the bay controllers and/or protective devices to the switching devices or switches controlled by them, in DIGSI 5.

Automatically detecting the topology of the switching arrangement on the basis of the topology or the switchgear drawn in DIGSI 5 by a modified search (see FIGS. 6 to 8).

Creating operationally dependent interlocking conditions or inputting an operating philosophy. Safety-related interlocking conditions are known to the system (for example do not switch voltage to ground, see introduction). On this basis, GOOSE connections for a communication network between the respective bay controllers and protective devices are automatically parameterized.

Only GOOSE connections that are required for a transmission of information relevant to the respective device concerning switch positions of the other devices, respectively, are taken into account, so that the data communication in the communication network is minimized.

Transmitting the configuration (topology, enabling or interlocking conditions, in particular operationally dependent enabling or interlocking conditions) together with details specifying the parameterized GOOSE connections (communication connections) to the bay controllers and protective devices.

During the operation of the switchgear, interlocking decisions are subsequently taken in each device in a decentralized manner on the basis of the reduced topology (only switching positions that are relevant from the viewpoint of the respective protective device are taken into account), with information concerning relevant switching positions of other disconnectors and/or power circuit breakers being transmitted by means of the automatically generated GOOSE connections.

Consequently, the following new aspects are obtained in direct comparison with the known methods for parameterizing interlocking and/or enabling conditions for bay controllers and/or protective devices of a switching arrangement:

a). The automatic detection of the topology is performed by a modified search, which reliably detects all the relevant paths.

b). Automatic detection of the elements in the single-line diagram on the basis of bay type and connected nodes.

c). Operationally dependent interlocking conditions, for example for maintaining a prescribed switching sequence of power circuit breakers and disconnectors, can be automatically taken into account.

d). In the modified search, use of the length (number) of the switching elements in the parallel path to check the admissibility of switching actions.

e). Length of the switching elements taking into account for the parallel paths.

f). Variable switching element length in such a way that, when coupling two longitudinally separated bus bar portions, the length of the elements is set to zero (otherwise the length is uniformly equal to 1).

Other features which are considered as characteristic for the invention are set forth in the appended claims.

Although the invention is illustrated and described herein as embodied in a method and an arrangement for parameterizing bay controllers and/or protective devices of a switching arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a schematic diagram of a second exemplary embodiment of the switching arrangement;

FIG. 4 is a schematic diagram of a third exemplary embodiment of the switching arrangement;

DETAILED DESCRIPTION OF THE INVENTION

Figure 1:
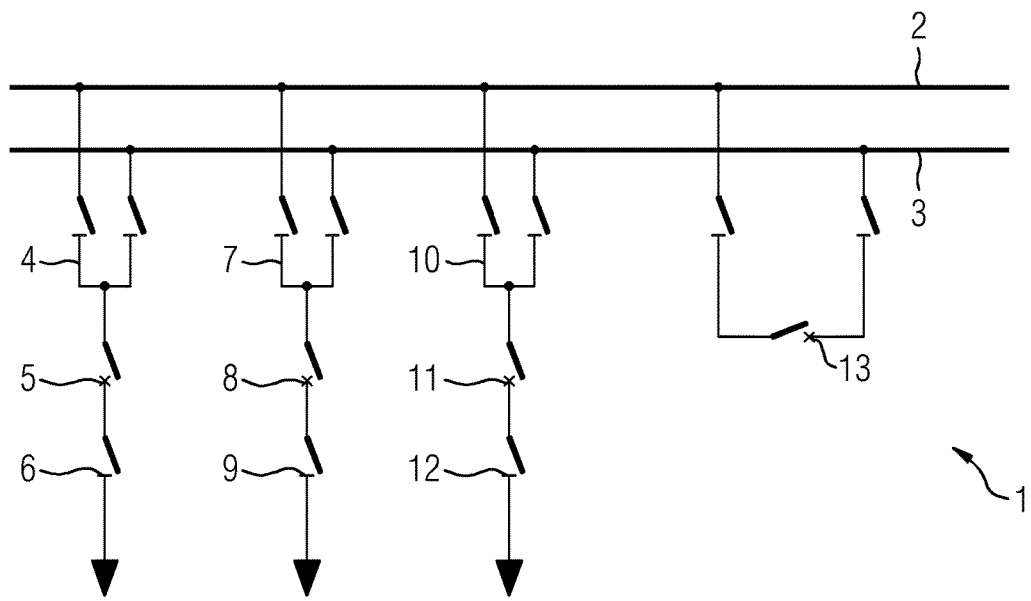
FIG. 1 is a schematic diagram of a first exemplary embodiment of a switching arrangement according to the invention.

Referring now to the figures of the drawings in detail and first, particularly to FIG. 1 thereof, there is shown a switchgear 1 which has two bus bars 2, 3, to which 4 bays with bay controllers and/or protective devices are connected.

Disconnectors 4 can be used for switching the first bay either to bus bar 2 or to bus bar 3. Also provided in the first bay is a power circuit breaker 5 and also a disconnector 6. The second bay, consisting of disconnector 7, power circuit breaker 8 and disconnector 9, and also the third bay, consisting of disconnector 10, power circuit breaker 11 and disconnector 12, are set up in the same way.

The fourth bay is a coupler bay 13 with three switches.

If switchgear interlocking is to be implemented for this switchgear, it is not necessary to know the current position of all switches for the switching decisions in the first bay.

Figure 2:
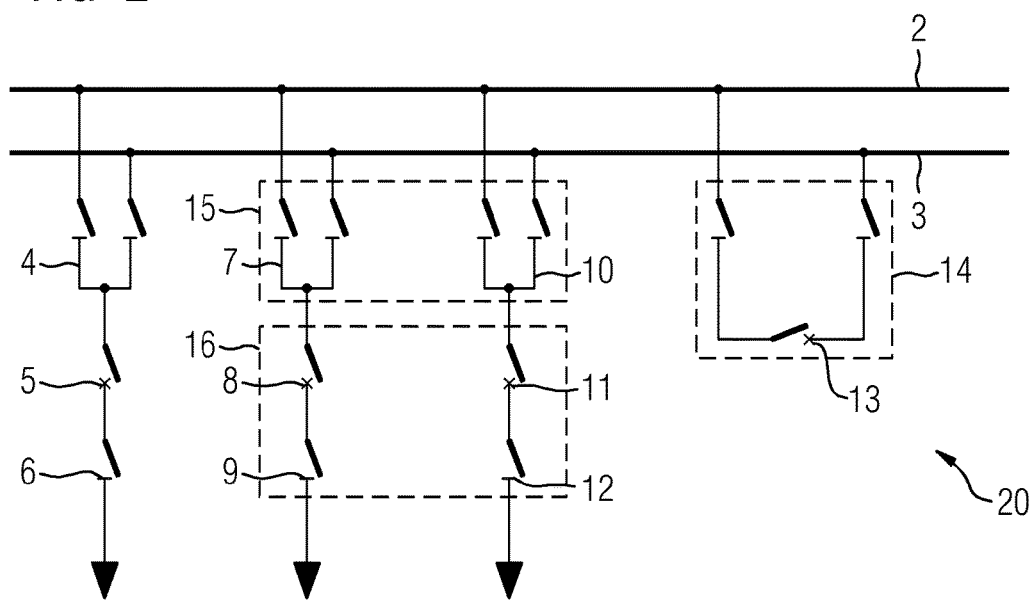
FIG. 2 is a schematic diagram of an example of a division of switches of the first exemplary embodiment into switching positions that are relevant for interlocking and switching positions that are not relevant.

In FIG. 2, the same subassemblies as in FIG. 1 are provided with the same designations. The power circuit breakers 8 and 11 and the disconnectors 9 and 12 of the second and third bays are shown framed by a dashed line in the box 16, since these switching elements do not play any part in making a decision on enabling switching of switching elements in the first bay. Thus, only the coupling 14 of the bus bars and the disconnectors 7 and 10 (box 15) that are adjacent to the bus bars is of interest.

If, for example, one of the disconnectors 7 in box 15 that connect the second bay to the bus bars is closed, it can be assumed that the power circuit breaker 8 and the outgoing disconnector 9 are also closed. From this assumption it can be concluded that the information concerning the switching position of power circuit breakers and outgoing disconnectors of other bays is not needed for the interlocking in the one specific bay to allow correct interlocking decisions to be taken.

In addition to the components already known from FIGS. 1 and 2, FIG. 3 shows also for each of the three bays a respective grounding switch 26, 27, 28, on the left in the figure. By means of the grounding switch 26, 27, 28, the respective side of the power circuit breaker can be switched to ground potential 21.

If, for example as part of a prescribed operating philosophy, a "further transfer of ground potential" is activated for operationally dependent interlocking, it is necessary to transmit in addition to the already mentioned switching devices also the positions of the grounding switches 26, 27 that are adjacent to a node of the bus bar disconnectors 4, 7, 10. Therefore, the switches 26 and 27 (box 24) are to be taken into account for the switching decisions of the elements 4, 5, 6, 21, along with the switches 7, 10, 13 (boxes 15, 14) that are already to be taken into account. The switching positions of the switches 8, 9, 11, 12 in box 16 are not needed.

FIG. 4 shows switchgear with a so-called one-and-one-half breaker configuration. At the top and bottom of the figure there are the bus bars 2 and 3. Shown framed by dashed lines in the boxes 31, 32 and 33 are three bays or portions with numerous power circuit breakers and disconnectors. With the arrows 37, 41, 71, 72, 63, 67, the connections of the bays to downstream elements of the supply system are indicated. It is a major advantage of the so-called one-and-one-half breaker configuration, in which three power circuit breakers for two outgoing units are used in each bay, that even in the event of failure of individual switches power can be supplied to the outgoing units "from the other side".

For the 1½ breaker configuration of the switches in box 31 (switches 34, 35, 36, 38, 39, 40, 42, 43, 44), the switching positions of the switches in the boxes 70, 71, 72, 73, 74 and 75 are needed (switch numbers 45, 46, 50, 54, 55, 56, 57, 61, 65 and 66).

Not needed are the switching positions of the switches in the boxes 76, 77, 78 and 79 (switch numbers 47, 49, 51, 53, 58, 60, 62 and 64).

Figure 5:
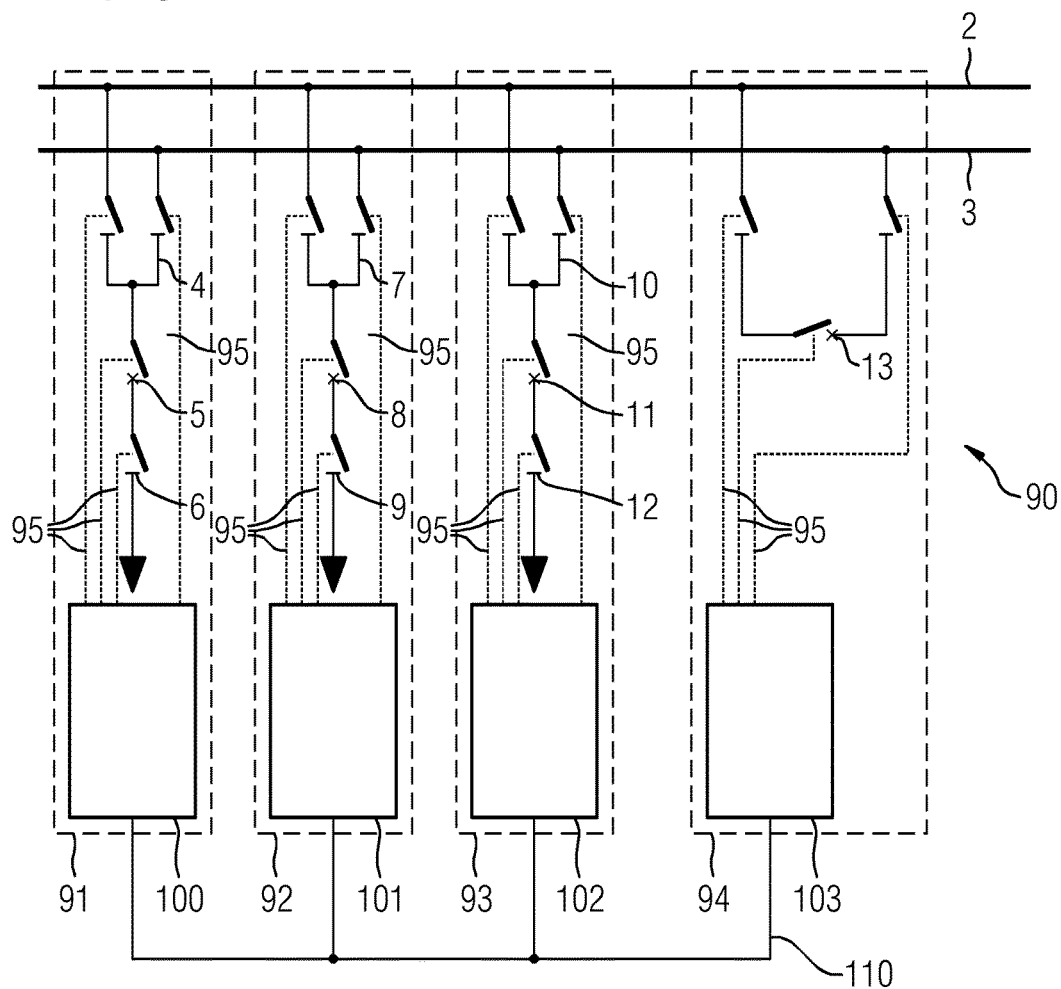
FIG. 5 is a schematic diagram of a fourth exemplary embodiment of the switching arrangement.

Shown in FIG. 5 is a switchgear 90 which is comparable to FIGS. 1 and 2 and in which there is additionally arranged in each of the bays bordered by dashed-line boxes 91 to 94 a bay controller 100-103 that is connected by way of communication connections 95 to the respective switches of the bay. The communication connections 95 represent direct wiring between the respective bay controller or protective device 100-103 and the respective switch control; switching commands for opening and closing the switches are transmitted. The protective devices 100-103 are connected to one another by way of the communication bus 110, in order to exchange with one another information concerning switching positions in the neighboring bays. In this case, the switching positions of the switches in the respective bays may be exchanged for example by means of GOOSE messages. As a possible addition to this embodiment, on the communication bus 110 a connection to a control device for the entire switchgear may also be provided (not shown), so that along with the decentralized decision on interlocking or enabling switching actions a central control device can also be informed.

If, for example, the bay controller 100 fails, it can no longer transmit information concerning the switch positions of the switches in the first bay (box 91) to the bay controllers 101-103. A failure may be detected for example by the fact that the bay controllers 101-103 no longer obtain up-to-date data via GOOSE from the bay controller 100. Nevertheless, the rest of the installation can still switch in an interlocked manner, since the control of the switches in the other bays takes place in a decentralized manner by means of the bay controllers 101-103 connected there. These controllers can then still exchange the current switching positions with one another and, for example by means of a data memory that stores the last valid switch positions of the first bay, also take the switching state of the first bay into account for the evaluation. However, there is in this case the restriction that it is only permitted to intervene in the switch positions of the other bays in such a way that inadmissible operating states in the other bays cannot occur. This means for example that switching off in the outgoing feeder bay is permitted, but switching on of the outgoing feeder bay is not permitted and, in the event of a failure in the coupler bay, no changes may be made in the coupler bay. In case of doubt, switches for which the switching position cannot be determined may be regarded as closed if they are in outgoing feeder bays and open if they are in coupler bays.

By contrast with this, in the case of switchgear with a central device that establishes the cross-bay interlocking conditions and controls the switch positions of the individual bays, in the event of failure of this central device no interlocked switching actions may be carried out any longer.

Figure 6:
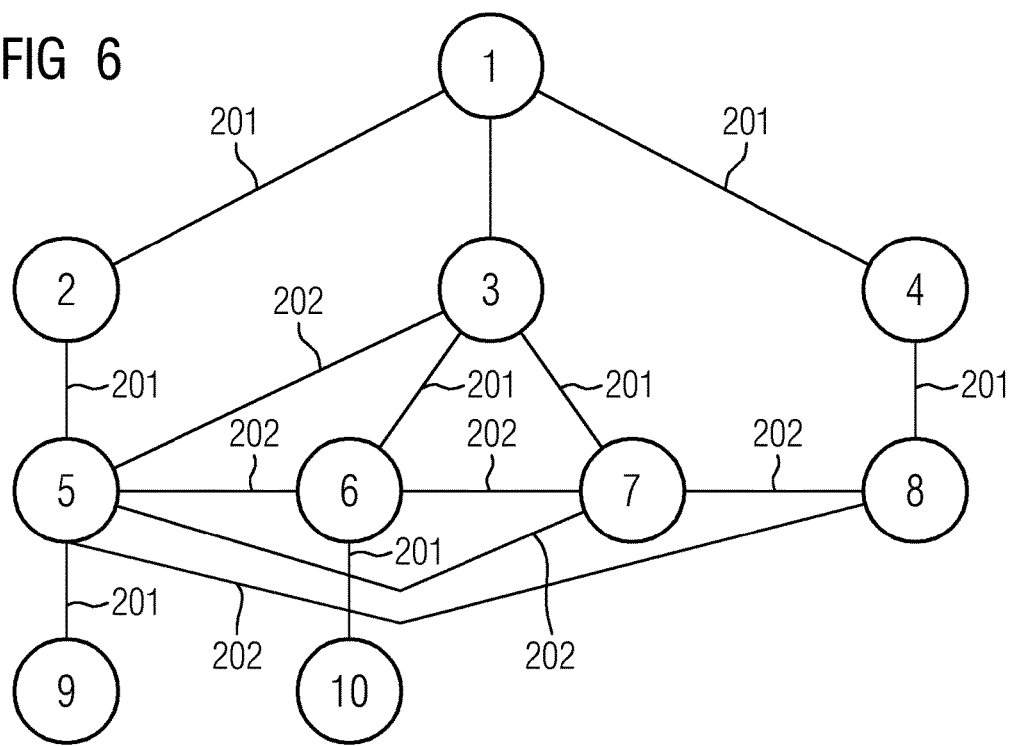
FIG. 6 is an illustration of a first exemplary embodiment of topology detection.
Figure 7:
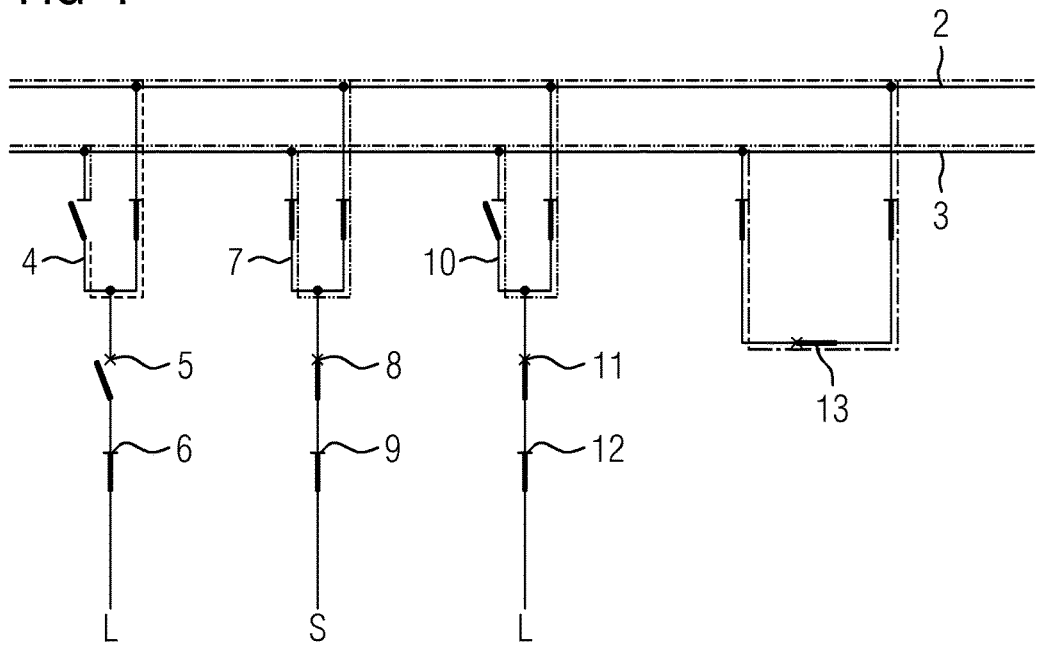
FIG. 7 is a schematic diagram of a second exemplary embodiment of the topology detection.
Figure 8:
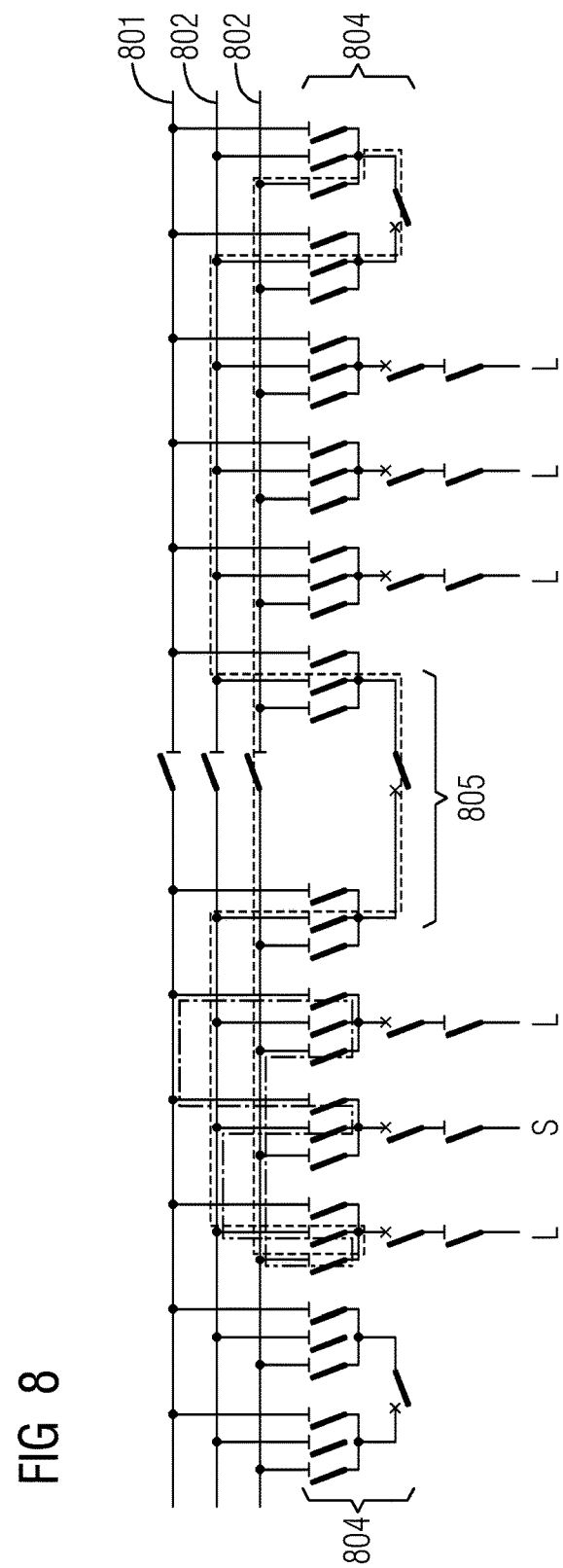
FIG. 8 is a schematic diagram of a third exemplary embodiment of the topology detection.

On the basis of FIGS. 6 to 8, there follows a discussion of a modified search in the detection of the topology of a network, for example of a switching arrangement.

In order to be able to detect the topology of switchgear reliably and quickly from a single-line diagram, a pattern recognition that is improved in comparison with the prior art or an improved searching method must be carried out.

If a breadth-first search and a depth-first search are carried out, there is the problem that, although all nodes are addressed, not all edges are taken into account (see FIG. 6). For this reason, the required parallel path is possibly not found. As shown by way of example in FIG. 6, all of nodes 1 to 10 are found; as far as the edges are concerned, however, only the edges 201 are taken into consideration. The edges 202 are not, however, because they no longer lead from the nodes to new nodes.

If this idea is applied to a switchgear, and a search is carried out by means of a depth-first search starting from the left switch of the two switches 4—in FIG. 7—, first the bus bar 3 is found, then the closed disconnectors in the bay S, before returning to the side of the aforementioned switch 4 (line of dashes each with two dots). Although the coupling 13 is found (line of dashes each with one dot), the parallel path is not found, since the left switch of the two switches 4 was already marked as seen when the way via the disconnectors 7 was found.

If it is therefore required that a coupling has to be closed, the path must also be found. This can be achieved by using a modified breadth-first and depth-first search.

In this case, starting from the switching element being considered, the connected bus bars are searched, and the depth-first search is started from there. When a bus bar portion has been found, the search looks for further connected bus bar portions of the same first bus bar that are connected to the first bus bar and can consequently be regarded as a node. Thus, in the case of relatively large installations, the shortest parallel path can be reliably found by the breadth-first search; in the depth-first search, the necessary parallel paths are found and identified.

One example of a search modified in this way is represented in FIG. 8. In this case, three bus bars 801, 802, 803 are divided into a right-hand portion and a left-hand portion, which are connected by way of a coupling 805. Each portion also has a portion coupling 804. In both portions, three bays are respectively provided.

In the case of such relatively large installations that are longitudinally separated, for example, the path in the left-hand portion is found first—the cross-portion path by way of the couplings 805 and the right-hand coupling 804 is not detected. This problem also exists if the search is started from both sides or portions.

In the case of the above example according to FIG. 7, the necessary parallel paths can be found by starting the search from the other side of the switch. If, however, the installation becomes larger, as in FIG. 8, and there is a longitudinal separation, this also means that the limits are met: the search must start from the bus bars. Furthermore, the longitudinally coupled bus bar must be regarded as a node, so that the necessary paths can be identified.

Figure 9:
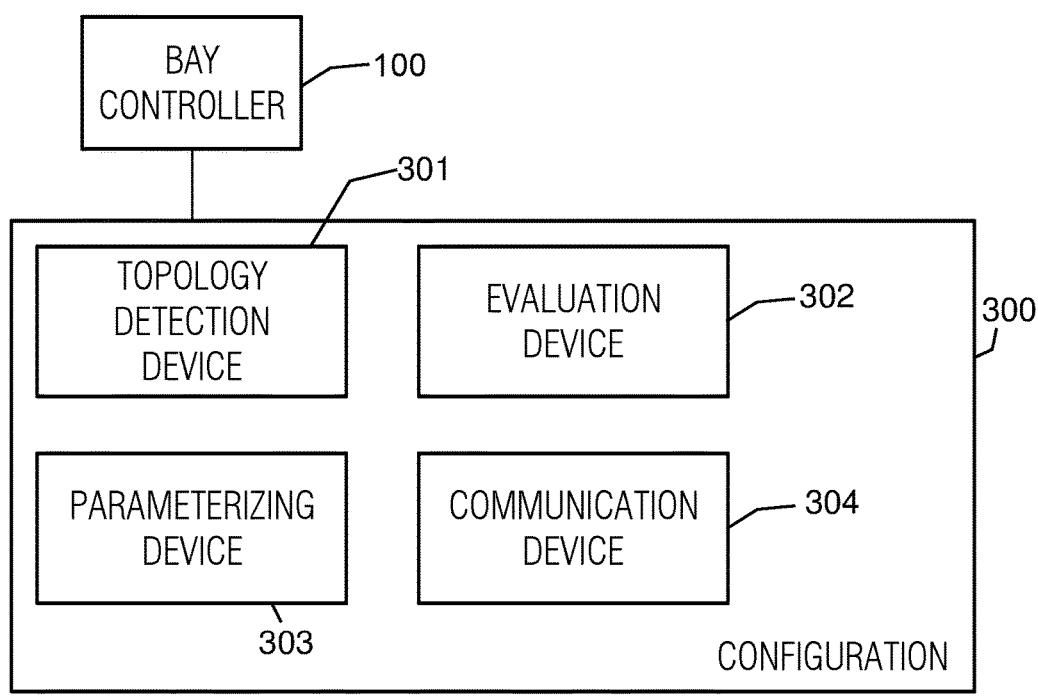
FIG. 9 is a block diagram of a configuration for parameterization of a bay controller.

FIG. 9 shows a configuration 300 for automatic parameterization of bay controllers 100 and/or protective devices of a switching configuration. The configuration has a topology detection device 301 for automatically detecting a topology of the switching configuration on a basis of topology information and an evaluation device 302 for automatically determining interlocking and/or enabling conditions for at least one device on a basis of the topology. A parameterizing device 303 is provided for automatically specifying communication connections for the device while taking into account the interlocking and/or enabling conditions determined for the device. A communication device 304 is provided, so that the device can be parameterized with the interlocking and/or enabling conditions and the communication connections and the topology determined for the device. Whereby an interlocking or enabling of a switching action in the at least one device is controllable during an operation of the switching configuration.

The invention claimed is:

1. A method for automatic parameterization of at least one of bay controllers or protective devices of a switching configuration, which comprises the steps of:
   automatically detecting a topology of the switching configuration on a basis of topology information, the switching configuration being part of an electrical supply system;
   using a single-line diagram of an interconnection of bus bars, bays, power system groups, power circuit breakers, disconnectors, bay controllers and/or the protective devices as the topology information;
   automatically determining interlocking and/or enabling conditions for at least one device on a basis of the topology, wherein the at least one device is selected from the group consisting of the bay controllers and the protective devices;
   automatically specifying communication connections for the at least one device to indicate a way in which information will be conveyed while taking into account the interlocking and/or enabling conditions determined for the device; and
   parameterizing the at least one device by setting the at least one device with information specifying the interlocking and/or enabling conditions and the communication connections and the topology determined for operating the device, so that interlocking or enabling of a switching action in the at least one device is controllable during an operation of the switching configuration; and
   detecting the topology information by means of a search method, in which bus bars and/or bus bar portions that are connected in an electrically conducting manner to a found bus bar and/or a bus bar portion are regarded as a contiguous node;
wherein the search method includes a combination of a breadth-first search and a depth-first search, and the breadth-first search is conducted before the depth-first search.

2. The method according to claim 1, which further comprises taking into account safety-related interlocking and/or enabling conditions and operationally dependent interlocking and/or enabling conditions for the determination of the interlocking and/or enabling conditions.

3. The method according to claim 2, which further comprises automatically parameterizing the operationally dependent interlocking and/or enabling conditions on a basis of a prescribed operating philosophy.

4. The method according to claim 1, which further comprises only parameterizing ones of the communication connections for a transmission of information relevant to the at least one device concerning switch positions of other devices respectively, so that data communication between the at least one device and the other devices is minimized.

5. The method according to claim 1, which further comprises storing determined interlocking and/or enabling conditions in a general configuration file, which contains parameters of at least one of the bay controllers or the protective devices, wherein the parameters specify the interlocking and/or enabling conditions that are relevant for an individual device on a basis of detected topology and the communication connections that are parameterized for a respective device and the topology are stored in each case in a device-specific configuration file, which is transmitted to the respective device.

6. The method according to claim 5, wherein in accordance with International Electrotechnical Commission standard 61850-8-1 a so-called "system configuration description" file is used as the general configuration file and so-called "configured intelligent device description" files are used as the device-specific configuration files, the "configured intelligent device description" files corresponding to a "Generic Object Oriented Substation Events" standard.

7. The method according to claim 1, which further comprises detecting automatically voltage and current meters of the switching configuration.

8. A system for automatic parameterization of at least one of bay controllers or protective devices of a switching configuration, the configuration comprising:
a topology detection device for automatically detecting a topology of the switching configuration on a basis of topology information, the switching configuration being part of an electrical supply system, wherein the topology information includes at least one of a single-line diagram of an interconnection of bus bars, bays, power system groups, power circuit breakers, disconnectors, bay controllers or protective devices;
an evaluation device for automatically determining interlocking and/or enabling conditions for at least one device on a basis of the topology, wherein the at least one device is selected from the group consisting of the bay controllers and the protective devices;
a parameterizing device for automatically specifying communication connections for the at least one device to indicate a way in which information will be conveyed while taking into account the interlocking and/or enabling conditions determined for the device; and
a communication device, so that the at least one device can be parameterized by setting the at least one device with information specifying the interlocking and/or enabling conditions and the communication connections and the topology determined for operating the device, whereby an interlocking or enabling of a switching action in the at least one device is controllable during an operation of the switching configuration;
said topology detection device configured to detect the topology information by means of a search method, in which bus bars and/or bus bar portions that are connected in an electrically conducting manner to a found bus bar and/or a bus bar portion are regarded as a contiguous node;
wherein the search method includes a combination of a breadth-first search and a depth-first search, and the breadth-first search is conducted before the depth-first search.

9. The system according to claim 8, wherein said evaluation device is configured to determine the interlocking and/or enabling conditions by taking into account safety-related interlocking and/or enabling conditions and operationally dependent interlocking and/or enabling conditions.

10. The system according to claim 8, wherein said evaluation device is configured to parameterize operationally dependent interlocking and/or enabling conditions automatically on a basis of a prescribed operating philosophy.

11. The system according to claim 8, further comprising other devices, wherein said parameterizing device is configured to parameterize only ones of the communication connections for a transmission of information relevant to a respective device concerning switch positions of the other devices, respectively, so that data communication between the at least one device and the other devices is minimized.

* * * * *